United States Patent
Liu et al.

(10) Patent No.: US 11,238,367 B1
(45) Date of Patent: *Feb. 1, 2022

(54) DISTRIBUTION OF CONTENT BASED ON MACHINE LEARNING BASED MODEL BY AN ONLINE SYSTEM

(71) Applicant: Facebook, Inc., Menlo Park, CA (US)

(72) Inventors: Yucheng Liu, Fremont, CA (US); Robert Oliver Burns Zeldin, Los Altos, CA (US); Yi Liu, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 843 days.

This patent is subject to a terminal disclaimer.

(21) Appl. No.: 16/005,630

(22) Filed: Jun. 11, 2018

(51) Int. Cl.
*G06Q 30/02* (2012.01)
*G06Q 10/06* (2012.01)
*G06N 20/00* (2019.01)
*H04L 29/08* (2006.01)
*G06N 7/00* (2006.01)

(52) U.S. Cl.
CPC .............. *G06N 20/00* (2019.01); *G06N 7/005* (2013.01); *H04L 67/10* (2013.01)

(58) Field of Classification Search
CPC ............ H04L 41/5048; H04L 43/0805; G06Q 10/067; G06Q 30/0202; G06Q 30/0246; G06Q 50/01; G06F 3/048
See application file for complete search history.

(56) References Cited

U.S. PATENT DOCUMENTS

| | | | |
|---|---|---|---|
| 7,594,189 B1 * | 9/2009 | Walker | G06F 16/9535 715/811 |
| 8,843,482 B2 * | 9/2014 | Buriano | G06F 16/58 707/732 |
| 9,183,259 B1 * | 11/2015 | Marra | G06F 16/9535 |
| 9,904,949 B1 | 2/2018 | Tavernier | |
| 10,915,929 B1 * | 2/2021 | Huang | H04N 21/47211 |
| 10,977,149 B1 * | 4/2021 | Zappella | G06F 16/957 |
| 2008/0097813 A1 * | 4/2008 | Collins | G06Q 30/0249 705/14.48 |

(Continued)

OTHER PUBLICATIONS

United States Office Action, U.S. Appl. No. 15/412,778, dated May 1, 2018, 10 pages.

(Continued)

*Primary Examiner* — Abdullahi E Salad
(74) *Attorney, Agent, or Firm* — Fenwick & West LLP

(57) ABSTRACT

An online system performs distributes content items received from content provider systems. The online system selects content items for sending to users based on values associated with user actions performed by users responsive to accessing the content items. The online system uses machine learning based models for predicting expected values of user actions associated with content items. The machine learning model may be a neural network model with a shared component and a plurality of dedicated components, each dedicated component trained to predict a term used for determining the expected value. The neural network is trained using labeled data where the labels are normalized expected values. The online system performs calibration of the predicted values to determine a denormalized value for use in selecting content items for delivery to users.

20 Claims, 10 Drawing Sheets

(56) References Cited

U.S. PATENT DOCUMENTS

| | | |
|---|---|---|
| 2009/0248511 A1 | 10/2009 | Mehta et al. |
| 2009/0307081 A1 | 12/2009 | Rabbitt et al. |
| 2009/0327030 A1 | 12/2009 | Collins |
| 2011/0307321 A1* | 12/2011 | Tangney ................. H04L 67/02 705/14.41 |
| 2012/0047201 A1* | 2/2012 | Jain ........................ H04W 4/18 709/203 |
| 2018/0218392 A1* | 8/2018 | Slain ................. G06Q 30/0277 |

OTHER PUBLICATIONS

United States Office Action, U.S. Appl. No. 15/412,778, dated Nov. 5, 2018, 13 pages.
United States Office Action, U.S. Appl. No. 16/436,597, dated Apr. 1, 2020, 11 pages.

* cited by examiner

DISTRIBUTION OF CONTENT BASED ON MACHINE LEARNING BASED MODEL BY AN ONLINE SYSTEM

FIELD OF INVENTION

The present disclosure generally relates to distribution of content items by an online system for presenting content items to users of the online system and more specifically to using machine learning based models for distributing contents.

BACKGROUND

An online system presents content items to its users. The content items may be received from a third party content provider systems. The online system may distribute the received content items to users, for example, as part of news feed. Online systems controls various aspects of content distribution, for example, the rate at which content items are distributed and users to whom content items are distributed. Online systems often use machine learning based models, for example, neural networks to determine various aspects of content distribution. For example, machine learning based models may be used to determine a likelihood of a user being interested in a content item.

However different content items have different levels of significance for a content provider. For example, a content provider may prefer to send certain content items to a user in spite of the likelihood of the user interacting with these content items being low since that content item may be highly significant for the content provider. Conventional models fail to account for differences in significance of content items while distributing them. Therefore such models are inadequate in terms of distributing content for these content providers.

SUMMARY

An online system receives content items from content provider system and distributes them to users of the online system. The online system receives a request for a user session. The online system selects a plurality of candidate content items for providing to the user and selects a candidate content item for sending to the user during the session. For each candidate content item, the online system performs the following steps. The online system provides information describing the content item and session to a machine learning based model. The machine learning based model comprises: (a) a shared component, (b) a first dedicated component for predicting a first score value representing a likelihood of a user action given a user interaction with the candidate content item, and (c) a second dedicated component configured to predict a second score value representing an expected value given the fact that a user action was performed. The online system determines an expected value associated with delivery of the candidate content item by executing the machine learning based model. The online system selects a candidate content item from the plurality of candidate items based on the expected values of the candidate content items. The online system sends the selected content item for presentation via the client device.

In an embodiment, the expected value is a normalized value. The online determines a denormalized value associated with delivery of the candidate content item by applying a calibration factor to the normalized value. The calibration factor is determined based on an aggregate measure of values of user actions associated with impressions of content items.

In an embodiment, the machine learning based model is trained using training data describing past user actions performed by users responsive to being presented with content items. The training data comprises information describing the user action and information describing a tracking request received by the online system describing the user action. The training data further comprises a label representing a normalized value associated with the user action, the normalized value determined using a value associated with the user action, and a mean value of past user actions associated with content items, the mean value determined over a moving window or over a fixed number of recent user actions.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
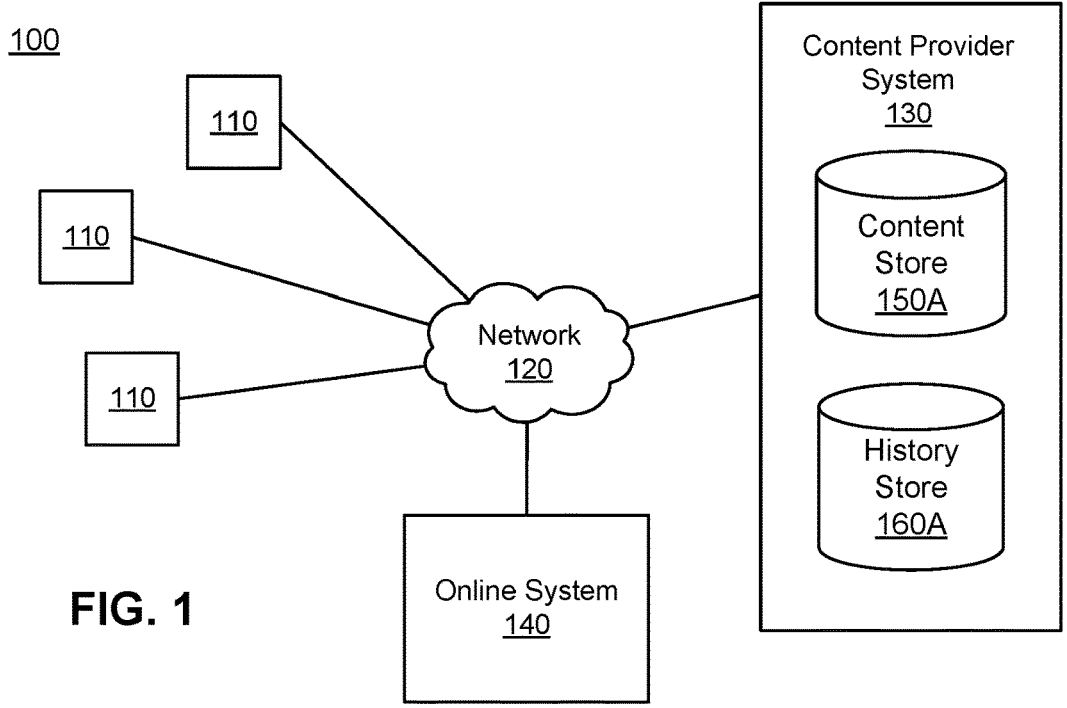
FIG. 1 is a system environment in which an online system operates, in accordance with an embodiment.

FIG. 1 is a system environment 100 in which an online system 140 (e.g. an online system) operates. The online system 140 communicates with client devices 110 and a content provider system 130 through a network 120. In alternative configuration, different and/or additional components may be included in the system environment 100. For example, the system environment 100 may include multiple content provider systems 130 with which the online system 140 communicates.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. The client device 110 can receive content items from the online system 140 for display by the client device 110. In the above embodiments, the client device 110 may present content items via a browser application or an API running on the native operating system of the client device 110.

The client devices 110, the online system 140, and the content provider system 130 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The content provider system 130 is coupled to the network 120 for communicating with the online system 140. The content provider system 130 maintains a content store 150A which stores content items within the content provider system 130. Examples of content represented by an object include a page post, a status update, a photograph, a video, a link, a shared content item, a gaming application achievement, a check-in event at a local business, a brand page, an advertisement, or any other type of content. The content store 150A is configured similar to a content store 150B in the online system 140, in that the content store 150A stores content items for use by the content provider system 130. In one embodiment, a content provider system 130 is a content provider communicating content items to the online system 140.

In an embodiment, the content items provided by the content provider system 130 are sponsored content items for which the content provider system 130 provides remuneration to the online system 140 for distributing the content items which can be defined as a cost for each instance of distribution of a content item. An example of a sponsored content item is an advertisement. In other embodiments, the content provider system 130 provides content or other information for presentation directly to the client device 110.

In some instances, a user performs a user action responsive to accessing a content item provided by the content provider system that may be distributed by the online system. For example, if the content item describes a web site associated with the content provider system, a user may register with the website after viewing the content item. In other embodiments, a content item may describe an item, for example, a product or a service provided by the content provider system and the user action comprises completing a transaction, for example, a purchase of the item. The user may purchase the item described in the content item or a different item. As another example, the content describes a website and the user simply accesses the website. As another example, the content item describes an event and the user action comprises sending an RSVP message for the event or purchasing a ticket for the event or checking in to the location of the event.

In an embodiment, a content provider system 130 specifies one or more predetermined user action types that are of significance to the content provider system. For example, the content provider system 130 may specify user action types including registering with a website, accessing a website, performing a transaction, and so on as predetermined user actions. The content provider system 130 associates user actions of the predetermined user action types with values. A user action performed by a user responsive to accessing a content item is also referred to as a conversion. The value of a user action is also referred to as a conversion value.

The content provider system 130 may also provide the online system 140 with a conversion rate for distribution of the content items. The conversion rate is a ratio describing an expected value of user actions performed responsive to an instance of presentation to a user of the online system 140 (also referred to as an impression) over an expected cost of the instance of presentation. The content provider system 130 may also communicate other information to the online system 140, such as metadata describing content items stored by the content provider system 130. The content provider system 130 has a history store 160A which stores historical data describing conversions, i.e. past instances of users visiting the content provider system 130 in response to presentation of a content item by the online system 140. The historical data has a return value that specifies some benefit that the content provider system 130 received due to the conversion. The historical data may also include web pages visited, time of web page visits, corresponding content item that prompted the conversion, items purchased on visited web pages, or other actions performed on the content provider system 130. The content provider system 130 may transmit historical data to the online system 140. In other embodiments, the content provider system 130 may transmit some portion of the historical data, such as transmitting the return value for each conversion.

In an embodiment, the online system is a social networking system that allows users to connect with other users while providing users with the ability of sharing content items for presentation to other users of the online system 140. Users of the online system 140 may upload content items into the content store 150B of the online system 140. Additionally, client devices 110 or the content provider system 130 may transmit content items to the online system 140 which may be stored in the content store 150B.

Figure 2:
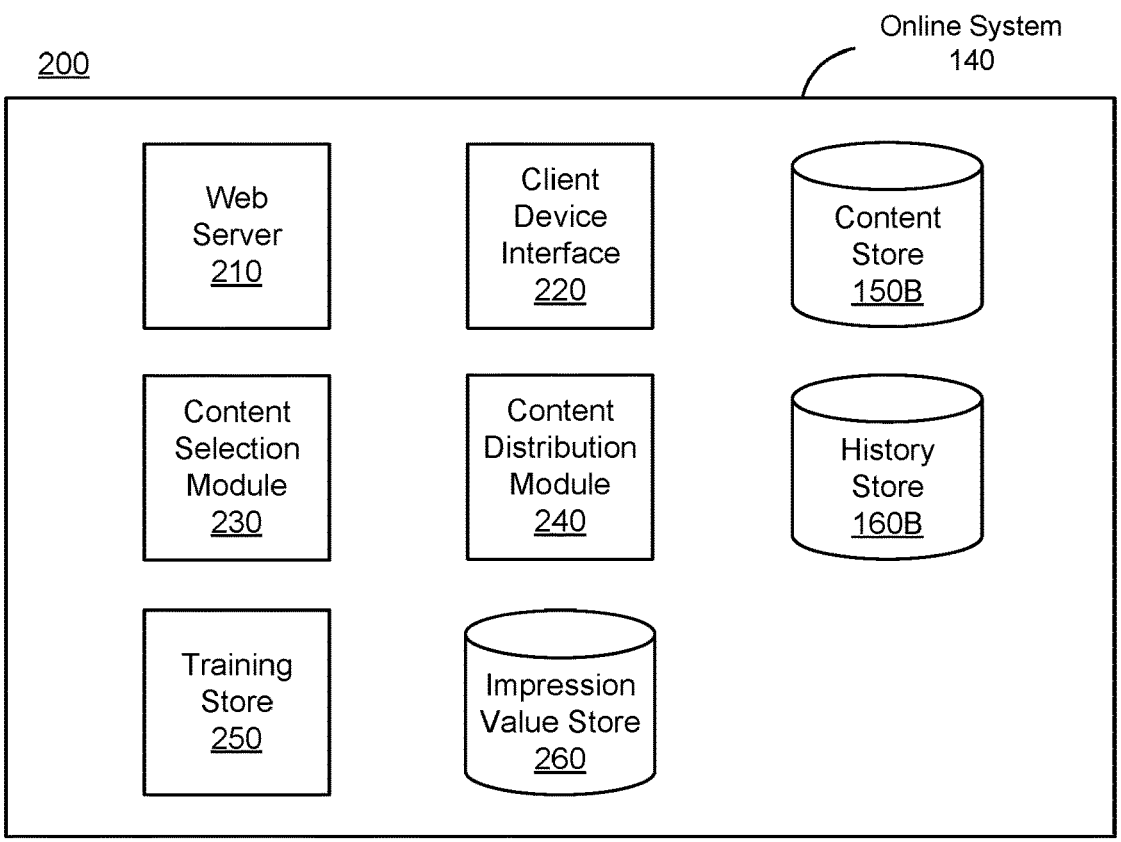
FIG. 2 is a system architecture for the online system of FIG. 1, in accordance with an embodiment.

FIG. 2 is a system architecture 200 for the online system 140 of FIG. 1, in accordance with an embodiment. The online system 140 includes various data stores and modules. Of the various data stores there are at least the content store 150B (operates similarly to the content store 150A), the history store 160B (operates similarly to the history store 160A), and the impression value store 260. Of the various modules there are at least a web server 210, a client device interface 220, a content selection module 230, and a content distribution module 240. In other embodiments, the system architecture 200 for the online system 140 includes additional or fewer components than those mentioned (i.e., a user profile store, an edge store, etc.).

The web server 210 links the online system 140 via the network 120 of FIG. 1 to the one or more client devices 110 of FIG. 1, as well as to the content provider system 130 of FIG. 1. The web server 210 serves web pages, as well as other content, such as JAVA®, FLASH®, XML and so forth. The web server 210 may receive and route messages between the online system 140 and the client device 110, for example, instant messages, queued messages (e.g., email), text messages, short message service (SMS) messages, or messages sent using any other suitable messaging technique. A user may send a request to the web server 210 to upload information (e.g., images or videos) that are stored in the content store 150B. Additionally, the web server 210 may provide application programming interface (API) functionality to send data directly to native client device operating systems, such as IOS®, ANDROID™, or BlackberryOS.

The client device interface 220 communicates with the one or more client devices 110 of FIG. 1 via the web server 210 by establishing a connection with the one or more client devices 110. The client device interface 220 receives device information from the client devices 110. The device information of a client device 110 may indicate various characteristics of a device user. The device information may store various preferences or attributes as stored by the device user. In some embodiments, each client device 110 may have a unique identifier within the online system 140. In additional embodiments, the unique identifier is assigned to the device user. The client device interface 220 upon establishing connections to client devices 110 may transmit content items to the client devices 110 for presentation to the device users. The established connection can also be used by the client device 110 to share content items to the online system 140. In these situations, the client device interface 220 receives the uploaded content items and may direct them to storage in the content store 150B.

The content store 150B stores objects that represent various types of content. Examples of content represented by an object include a page post, a status update, a photograph, a video, a link, a shared content item, a gaming application achievement, a check-in event at a local business, a brand page, an advertisement, or any other type of content. Online system 140 users may create objects stored by the content store 150B, such as status updates, photos tagged by users to be associated with other objects in the online system 140, events, groups or applications. In some embodiments, objects are received from third-party applications or third-party system separate from the online system 140 such as the content provider system 130. In addition, the content provider system 130 may provide a conversion rate for each content item provided to the online system 140. The content store 150B may append the conversion rate as metadata to the content item when stored in the content store 150B. Content items stored in the content store 150B may be tagged with various characteristics by the content store 150B. The content store 150B receives a request by the content selection module 230 for presentation of a content item to a user of the online system 140. The content store 150B searches for content according to the request and sends the content to the content selection module 230.

The content selection module 230 selects a content item from the content store 150B for presentation to a user of the online system 140. The content selection module 230 receives a request for a content item providing an opportunity for presentation of a content item to a user of the online system 140. In some embodiments, the request is received from a client device via the client device interface 220. After selecting a content item, the content selection module 230 provides the content distribution module 240 for distribution to the requesting user.

The content distribution module 240 distributes content to users of the online system 140. In some embodiments, the content distribution module 240 receives a content item selected by the content selection module 230 for sending to the user based on a value score determined by the content selection module. The content distribution module 240 may additionally rank content items based on their associated bids and select content items having at least a threshold position in the ranking for presentation to the user. Once a content item is selected for presentation to the user via the client device 110 by the content selection module 230, the content distribution module 240 sends the content item to the client device 110 through the client device interface 220. In an embodiment, the content distribution module 240 sends information describing the content item, for example, a URL associated with the content item. The content distribution module 240 waits for the user to provide an indication that the user is interested in the content item based on the information describing the content item, for example, as a result of the user clicking on the URL. Responsive to receiving a subsequent request from the user, the content distribution module 240 sends the content item for presentation via a display of the client device of the user.

The history store 160B stores historical data describing past instances of content delivery by the online system 140 for presentation to users. The historical data may include context of the session for which the content item was chosen, a value score of the content item chosen from the candidate content items, a time of delivery of the content item, information describing the session, value score of other candidate content items that were considered for potential delivery to the use, and/or user actions of the user corresponding to the presentation of the content item (e.g. user actions on an content provider system 130 and provided by the content provider system 130). The history store 160B may additionally store historical data transmitted by the content provider system 130 including user actions performed by users in association with the content provider system.

The training store 250 stores training data for training various machine learning based models, for example, models configured to determine values of impressions of content items. The training data includes a combination of the historical data from the history store 160A and the historical data form the history store 160B. The training data may include historical impressions and historical conversions either provided by the content provider system 130 or recorded by the online system 140. Additionally, the training store 250 can store generated training data as feature vectors for training a model based on the historical impressions and the historical conversions.

Figure 4:
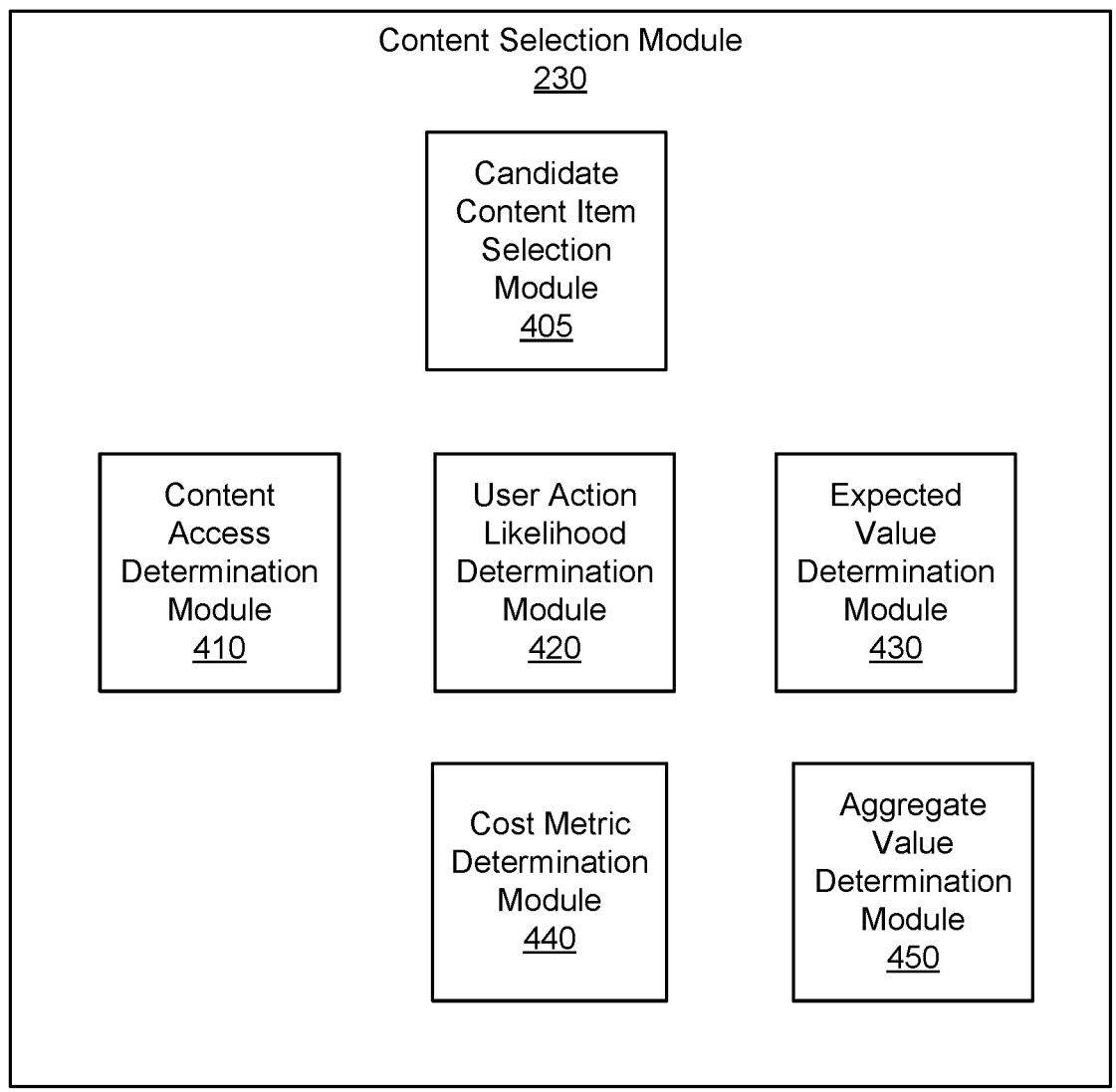
FIG. 4 is a system architecture for the content selection module 230, in accordance with an embodiment.

The impression value store 260 stores impression values for each content item as determined by the expected value determination module 430 (shows in FIG. 4). The impression value store 260 stores an expected value given a conversion has occurred and a conversion likelihood that a conversion is to occur given an impression. These can be determined for each content item in the content store 150A. The impression value store 260 may also store cost metric values as determined for each content item by the expected value determination module 430.

Figure 3:
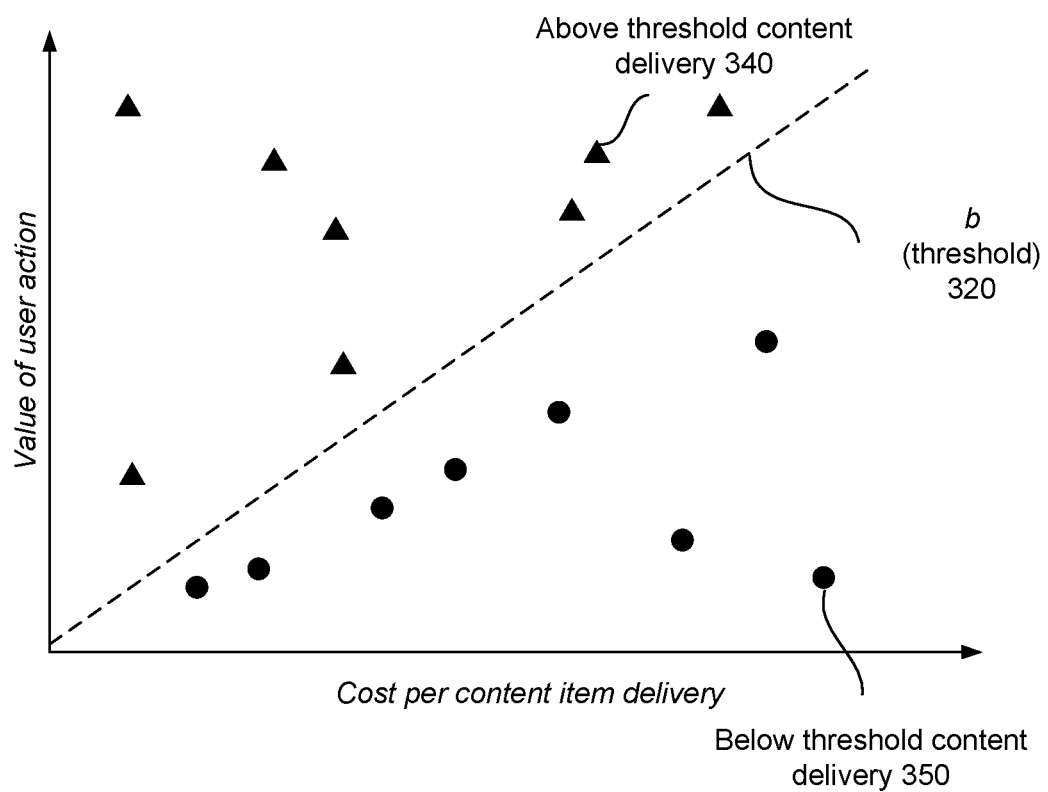
FIG. 3 is a graph representing historical opportunities in relation to a conversion rate, in accordance with an embodiment.

FIG. 3 is a graph 300 representing historical conversions in relation to a conversion rate (b) 320, in accordance with an embodiment. The conversion rate 320 is specified by a content provider system 130 (e.g. a content provider). A conversion refers to a predetermined user action associated the content provider system that is performed by a user responsive to accessing a content item provided by the content provider system. The graph 300 contains two axes. The x axis represents the cost per content item delivery and may be a value that is inverse of cost per action (1/CPA) i.e. a measure of cost incurred by the content provider system 130 as remuneration for a conversion from an impression by the online system 140 distributing the content item. They axis is a measure of value of user actions associated with an impression. The measure of value of user actions is also referred to return on ad spending (ROAS) which refers to a ratio of a value over a cost of a conversion. The data points in the graph 300 are various historical conversions of distributed content items from a single content provider system 130. Each historical conversion has both a cost measure and a value associated with the content provider system 130. The conversion rate 320 is a threshold for achieving at the very least some value over some cost. There are above b past conversions 340 indicated as triangles and below b past conversion 350 indicated as circles. The above b past conversions 340 include conversions that costed a bigger amount which are represented by triangles on the left side of the graph where 1/CPA is low and conversions that costed a lesser amount on the right side where 1/CPA is big. However, in either case, above b past conversions 340 surpassed the b 320 threshold. In comparison, below b past conversions 350 also include some that cost higher with others that cost lower, yet all below b past conversions 350 were below the b 320 threshold. The goal of the online system is to select content items for delivery to users that will surpass the b 320 threshold. Additionally, the online system may attempt to maximize the value for the content provider system when selecting content items for delivery to users.

FIG. 4 is a system architecture for the content selection module 230, in accordance with an embodiment. The content selection module 230 has a candidate content item selection module 405, a content access determination module 410, a user action likelihood determination module 420, an expected value determination module 430, and a cost metric determination module 430. Other embodiments may include more, fewer, or different modules than those indicated herein.

The content selection module 230 addresses the problem of estimating values vi of user actions associated with impression as $v_i = E(value|impression)$, i.e., the expected value of an impression given that the impression has occurred. Since a conversion (e.g., a purchase) can be an extremely rare event compared to impressions and clicks, directly modeling $E(value|impression)$, or $E(value|click)$ can be very difficult. As a result, the online system models post purchase value $E(value|purchase)$, i.e. The expected value given at least one purchase event has occurred.

The candidate content item selection module 405 identifies a user associated with a request received by the online system and retrieves user profile of the user. The candidate content item selection module 405 selects one or more candidate content items in the content store 150B with targeting criteria which match user profile attributes. The candidate content item selection module 405 selects one of the candidate content items based on an estimate of values of user actions associated with the candidate content items.

The content access determination module 410 determines a likelihood of the user accessing a given content item. In an embodiment, the content access determination module 410 uses a machine learning based model to determine the likelihood of the user accessing a given content item. The machine learning based model takes as input features describing the user profile of an input user and features describing an input content item and generates a score indicating a likelihood of the input user accessing the input content item.

The user action likelihood determination module 420 determines a likelihood of a user performing a predetermined user action specified by the content provider system, and referred to as a conversion likelihood. The user action likelihood determination module 420 identifies a total number of impressions of a content item and a total number of conversions from impressions of the content item from the training data. In one embodiment, the user action likelihood determination module 420 calculates the conversion likelihood by finding a percentage of the total impressions that are conversions from the impressions. In some embodiments, the user action likelihood determination module 420 calculates the conversion likelihood over a past interval. The conversion probability submodule transmits the conversion likelihood to the cost metric determination module 440. The user action likelihood determination module 420 may store the conversion likelihood for each content item in the impression value store 260.

The expected value determination module 430 determines an expected value of a predetermined user action performed by a user responsive to accessing a content item. The expected value determination module 430 normalizes the expected value associated with a content item using an aggregate value of user actions associated with the content provider system performed by users over a moving time window, for example, a moving time window of a week, two weeks, 28 days or any other size. In an embodiment, the expected value determination module 430 normalizes the expected value associated with a content item using an aggregate value of a fixed number of most recent associated user actions.

In an embodiment, the expected value determination module 430 retrieves the value for user actions within a recent time interval and averages the return value to generate the predicted return. In some embodiments, the expected value determination module 430 normalizes the expected value of an impression by dividing the expected value by the aggregate value of user actions over multiple content items. A content item may represent an advertisement and accordingly the value multiplier for the content item may be referred to as a return on advertising spending (ROAS) multiplier.

Each of the machine learning models described above is trained using training data from the training store 250.

In an embodiment, the content selection module 230 receives a measure of cost per unit value from a content provider system. The measure of cost per unit value is a threshold value provided by the content provider system. The measure of cost per unit value is also referred to as a bid provided by the content provider system. The online system optimizes the value of the impressions for the content provider system based on the measure of cost per unit value.

The cost metric determination module 440 determines a cost metric for a content item based on the normalized value of the impression, the likelihood of user action, and the measure of cost per unit value. The measure of cost per unit value associated with a content item specifies the content provider system's 130 expected value over expected cost for the content item delivery i.e., the impression.

The following equation describes the computation performed by the online system to determined the expected cost (expected_cost) of an impression. Accordingly, the expected_cost is determined as a product of the following terms (1) the bid representing the measure of the cost per unit value (2) P(user_action|impression) representing the likelihood of the user performing the predetermined user action responsive to an impression of the content item and (3) the normalizedValue representing the normalized value of the impression.

$$\text{expected\_cost} = \text{bid} * P(\text{user\_action}|\text{impression}) * \text{normalizedValue} \quad \text{(equation 1)}$$

The expected cost may also be referred to as eCPM representing the expected cost per mille (thousand impressions). The content selection module 230 selects a content item from a plurality of content items based on the expected cost metric for each candidate content item. The content selection module 230 provides the selected content item to the content distribution module 240 for presentation to a user of the online system 140.

Figure 5:
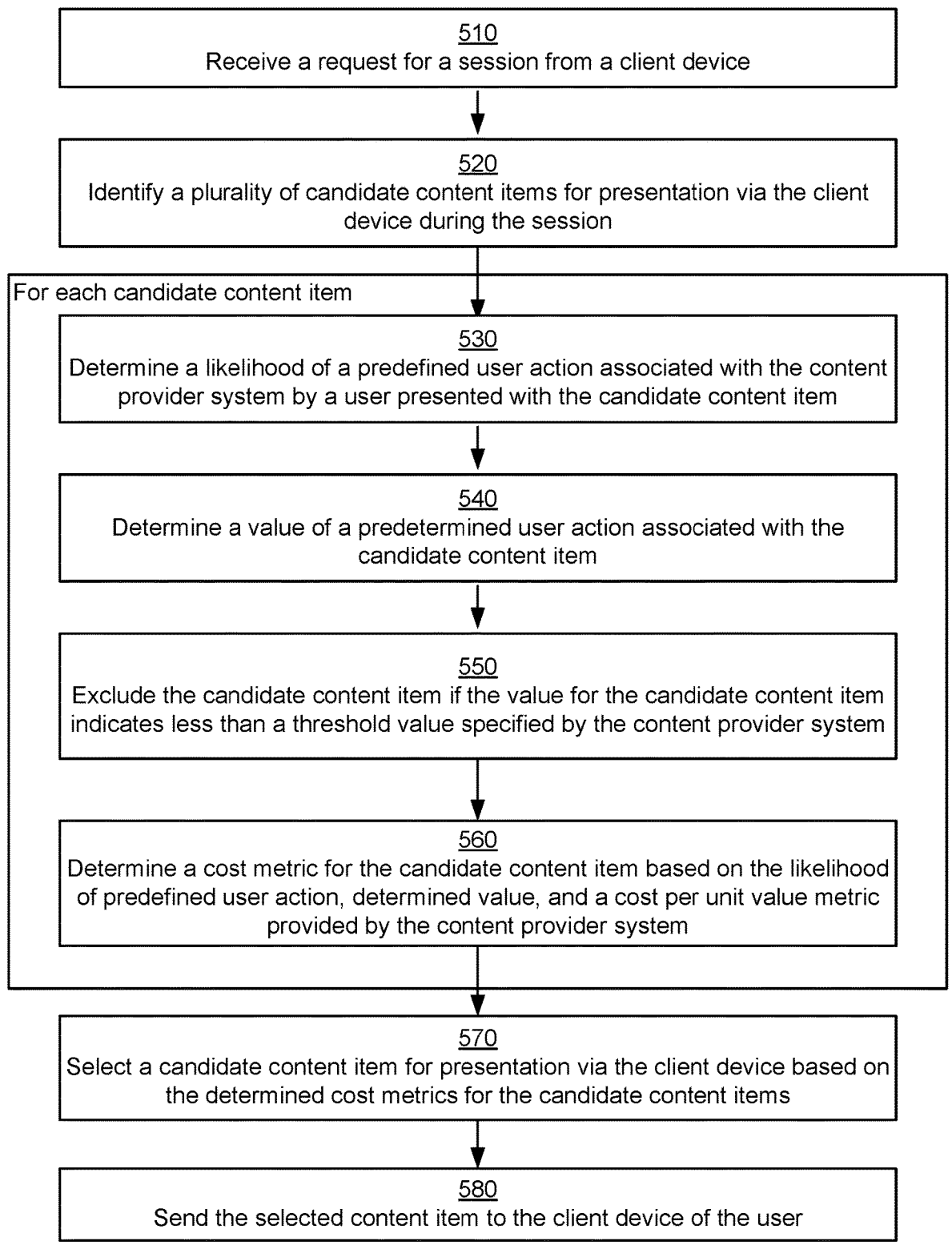
FIG. 5 is a flowchart describing the process of selecting a content item for delivery to a user, in accordance with an embodiment.

FIG. 5 is a flowchart describing the process of selecting a content item for delivery to a user, in accordance with an embodiment. The online system receives 510 a request for a session from a client device. The online system may identify an opportunity to provide content items to the user based on the request for session. For example, if the user is requesting news feed in a session, the online system may send one or more content items along with the news feed. Alternatively, the online system may present content items via a portion of a user interface of an application used for displaying the news feed, for example, in a side bar.

The online system 140 identifies 520 a plurality of candidate content items to be sent to the user based on the identified opportunity. The plurality of candidate content items are eligible for presentation to the user according to the identified opportunity. In some embodiments, the online system 140 identifies the candidate content items based on a user profile for the user stored in the online system 140. For example, the online system 140 may match the user profile attributes against targeting criterial specified by the content provider system for distributing the content item, for example, an age range, location, language, and so on.

The online system performs the following steps 530, 540, 550, and 560 for each candidate content item. The user action likelihood determination module 420 determines 530 a likelihood of the user performing a predefined user action specified by the content provider system. The expected value determination module 430 determines a value score for the candidate content item. The value score is indicative of a value of a user action that the user is likely to perform responsive to viewing the candidate content item. In an embodiment, the content access determination module 410 determines a likelihood that the user will view the content item responsive to sending information describing the content item via the client device. For example, of a URL of a video is presented to the user along with a thumbnail of an image associated with the video, the content access determination module 410 determines a likelihood that the user will click on the URL to access the video and view the video.

In an embodiment, the candidate content item selection module 405 excludes 550 the candidate content item if the value score for the candidate content item indicates less than a threshold value specified by the content provider system. The cost metric determination module 440 determines 560 a cost metric for delivery of the content item based on the likelihood of predefined user action, value score, and a cost per unit value metric provided by the content provider system. The candidate content item selection module 405 selects 570 a candidate content item for presentation via the client device based on the determined cost metrics for the candidate content items.

The content distribution module 240 sends 580 the selected content item to the client device of the user during the session. The online system 140 selects 570 a content item for presentation to the user based on the bids of the candidate content items. The online system 140 may rank the candidate content items according to the inputs as determined in the prior step 560. The online system 140 may additionally rank the candidate content items according to other parameters such as pacing filters for pacing inputs of a content item, relevance scores quantifying a relevance between each content item and the user, or other such factors. The online system 140 may then select a content item from the ranking. Once selected, the content item is presented to the user and recorded as an impression by the online system 140. In one embodiment, the content selection module 230 selects 570 the content item for presentation based on the inputs and then provides the selected content item to the content distribution module 240 for distribution to the user. In another embodiment, the content distribution module 230 selects 570 the content item for presentation based on the inputs.

Figure 6:
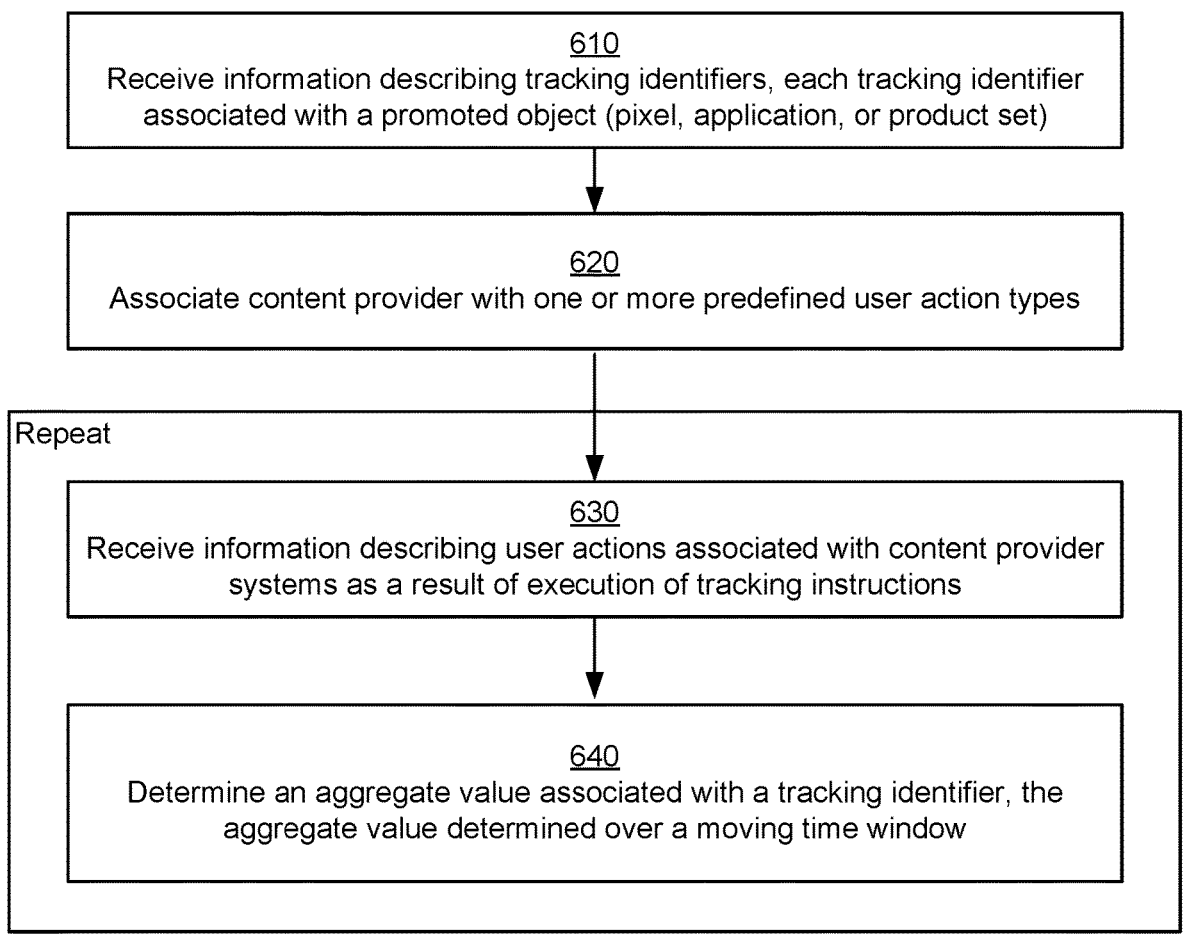
FIG. 6 is a flowchart 600 describing a process for determining an aggregate values of user actions associated with content items for normalizing values of impressions, in accordance with an embodiment.

FIG. 6 is a flowchart 600 describing a process for determining an aggregate values of user actions associated with content items for normalizing values of impressions, in accordance with an embodiment. In practice, the ranking models need to be calibrated across different content provider systems that are sending values that can be vastly different in scale. Therefore, the expected value model predicts a normalized value, referred to as roasMultiplier, wherein roasMultiplier=E(value|conversion)/meanValue, where meanValue is an external statistics representing the mean conversion value computed per promoted object (for example, a pixel, an application, or a product set) in a moving time window, for example, the last 28 days.

The aggregate value determination module 450 receives 610 information describing tracking identifiers, each tracking identifier associated with a promoted object (pixel, application, or product set). The aggregate value determination module 440 associates 620 content provider with one or more predefined user action types, for example, registration with a website, accessing a website, or making a purchase.

The aggregate value determination module 440 repeats the steps 630 and 640. The aggregate value determination module 440 receives 630 information describing user actions associated with content provider systems as a result of execution of tracking instructions. For example, the tracking instructions associated with a tracking identifier are executed by a client device responsive to displaying a web page associated with the content provider system. The tracking instructions are configured to send information describing the web page to the online system. In an embodiment, the web page comprises a tracking pixel, wherein the tracking instructions are executed by the client device responsive to rendering the tracking pixel on a display of the client device. In an embodiment, the tracking instructions associated with a tracking identifier are executed by an application executing on a client device responsive to a user performing a particular user action. The tracking instructions are configured to send information describing the user action performed via the application to the online system.

The aggregate value determination module 440 determines 640 an aggregate value associated with a tracking identifier. The aggregate value is determined over a moving time window or over a fixed number of most recent user actions. The aggregate value can be an average computed over a plurality of values. The steps 630 and 640 are repeated. The step 630 is repeated as user actions are executed. The step 640 may be executed periodically, for example, once every day.

Machine Learning Based Model for Predicting Expected Values of Impressions

The online system determines values of conversion associated with content item impressions using a machine learning model (for example, a neural network) configured to predict value of an impression. The online system uses the values of impressions determined by the machine learning model for distributing content items to users so as to maximize the aggregate value of content items distributed for a content provider system.

The online system monitors conversions associated with a content provider system or with a tracking mechanism used by the content provider system, for example, a tracking mechanism associated with a pixel, an application, or a product set. The online system stores training data comprising features describing a conversion, value of the conversion and a label representing a normalized conversion. The normalization prevents the model from being biased in favor of content providers sending extreme values, for example, as a result of an error in the tracking instructions such as incorrect currency specification.

The online system applies weights to training data to account for selection bias since the training data mostly comprises user interactions that lead to conversions. The weight used for eliminating selection bias is inversely proportionate to the likelihood of conversion given an impression (i.e., P(purchase impression)). The system uses calibration to correct predicted values to map them to actual values as opposed to normalized values used for training the model. In an embodiment, the online system maps conversions to total revenue generated during a time period to determine a scaling factor to be applied to predicted values for purposes of calibration.

Figure 7:
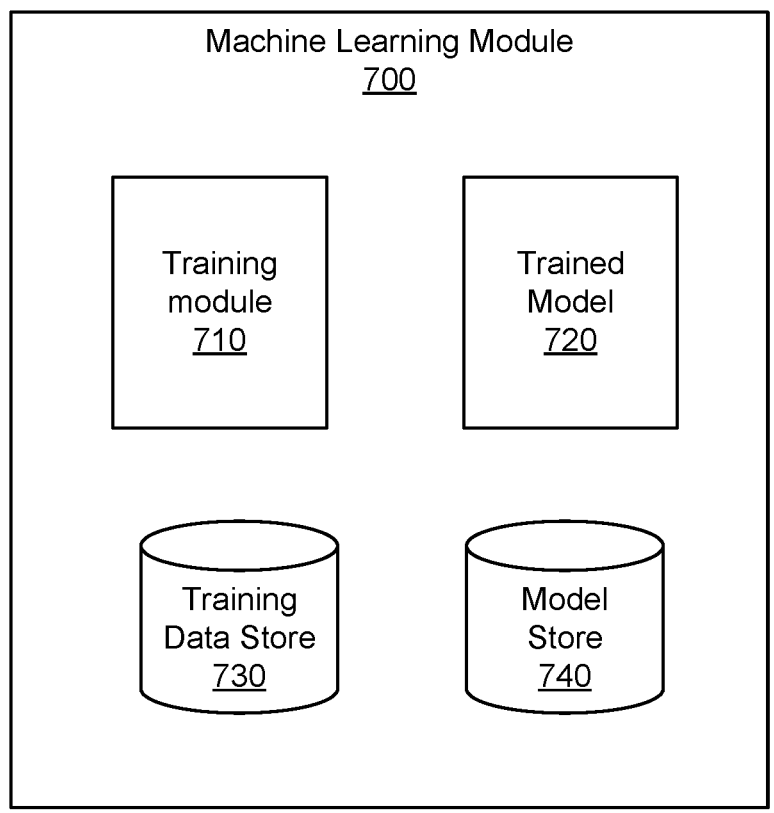
FIG. 7 is a system architecture for a machine learning module, in accordance with an embodiment.

FIG. 7 is a system architecture for a machine learning module, in accordance with an embodiment. The machine learning module 700 can be used for example, by the expected value determination module 430. The machine learning module 700, includes a training module 710, a training data store 730, a trained model 720, and a model store 740.

The trained model 720 is a machine-learning based model. In some embodiments, the trained model 720 is a neural network. As a neural network, the trained model 720 may comprise a plurality of layers. Each layer transforms one set of values to the next set of values.

In an embodiment, the trained model 720 takes as input a feature vector describing a conversion on a content provider's system and determines an expected value of user actions and a conversion likelihood for the content provider. The machine learning module 700 stores training data based on historical actions in the training data store 730. The training data comprises feature vector comprising (a) information describing a conversion action (e.g. registration with a website, a transaction performed by the user, an identifier for product/service that is purchased, etc.), (b) a value of conversion, for example, a purchase price of product/service purchased or an estimate of value of a user registering with a website of the content provider system, and (c) information describing the tracking mechanism used by the content provider system for reporting user actions to the online system, for example, a tracking pixel. The trained model 720 is stored in the model store 740 for further access by the online system.

Figure 8:
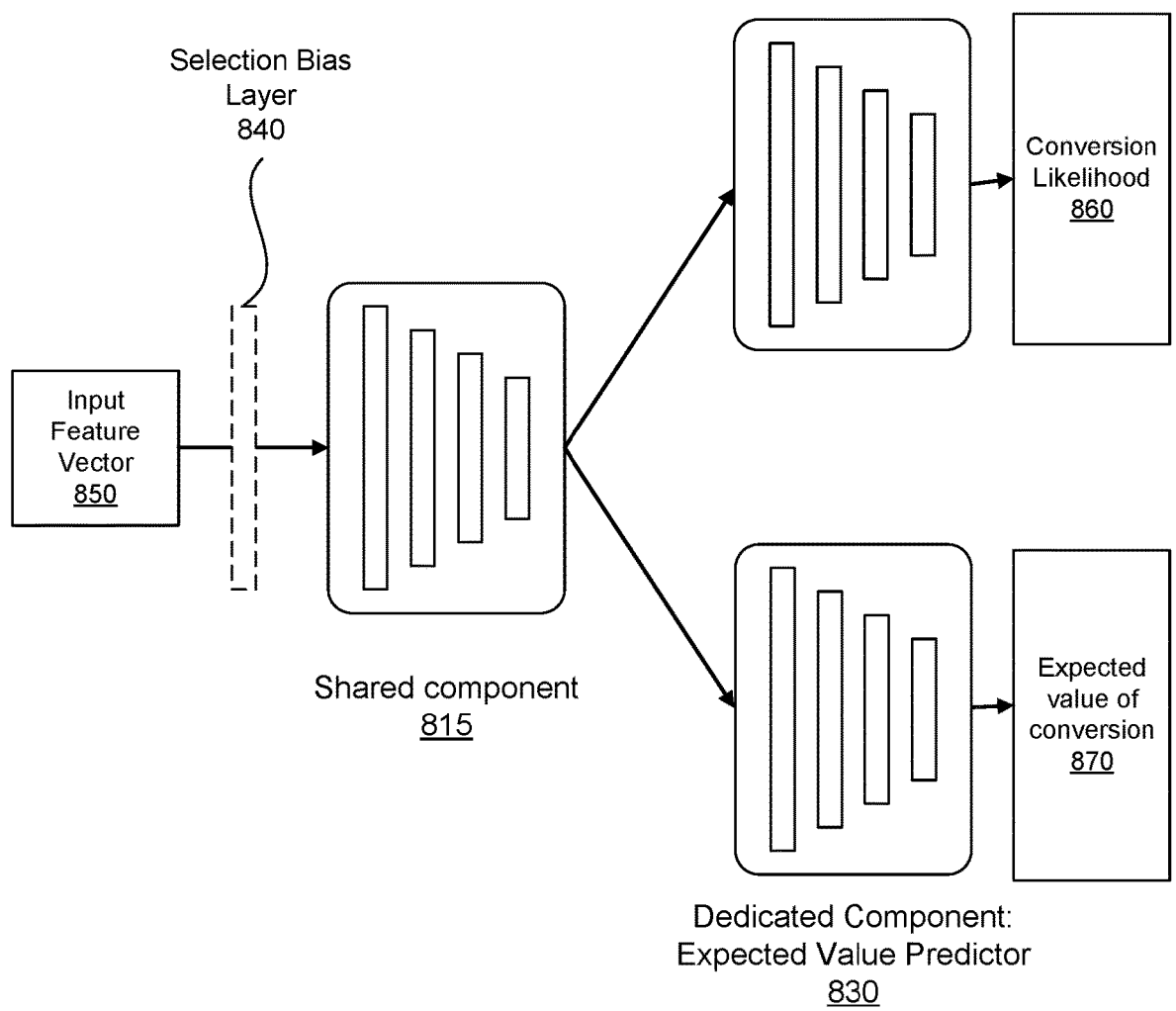
FIG. 8 is an illustrative representation of a trained model for predicting values of impressions, in accordance with an embodiment.

FIG. 8 is an illustrative representation of a trained model 810 for predicting values of impressions, in accordance with an embodiment. The trained model 810 has a shared component and two dedicated components, each dedicated component for predicting a score: (1) a first dedicated component for predicting a first score representing an expected value of an impression given a conversion occurs (2) a second component for predicting a second score representing a likelihood of a conversion given a user interaction with a content item (e.g., a click).

In an embodiment, the machine learning module 700 normalizes the conversion value and stores the normalized conversion value as a label for the training data. The machine learning module 700 may use various options for normalizing the conversions values. According to one embodiment, the machine learning module 700 normalizes the conversion value using the following equation as a ratio of the conversion value (value) and an average conversion value (meanValue=mean(value)).

$$\text{label} = \frac{\text{value}}{\text{meanValue}} \quad \text{(equation 2)}$$

In another embodiment, the machine learning module 700 normalizes the conversion value using the following equation as a ratio of the square root of the conversion value ($\sqrt{\text{value}}$) and a square root of average conversion value (meanValue=$\sqrt{\text{meanValue}}$).

$$\text{label} = \frac{\sqrt{\text{value}}}{\sqrt{\text{meanValue}}} \quad \text{(equation 3)}$$

In another embodiment, the machine learning module 700 normalizes the conversion value using the following equation as a ratio of the difference between value and meanValue and a standard deviation of the conversion values (stdValue).

$$\text{label} = \frac{\text{value} - \text{meanValue}}{\text{stdevValue}} \quad \text{(equation 4)}$$

In another embodiment, the machine learning module 700 normalizes the conversion value using the following equation as a ratio of the difference between square root of the conversion value ($\sqrt{value}$) and square root of the average value ($\sqrt{meanValue}$) with a square root of the standard deviation of the conversion values ($\sqrt{stdevValue}$).

$$label = \frac{\sqrt{value} - \sqrt{meanValue}}{\sqrt{stdevValue}} \quad \text{(equation 5)}$$

The machine learning module 700 determines the mean and standard deviation values on a per promoted object (pixel, app, product set) level, i.e., on per tracking identifier basis, wherein the tracking identifier is associated with tracking instructions for tracking/reporting user actions to the online system.

Nonlinear transforms such as square root function compress high values and elevate small values, making the distribution tighter. As a result, the transform provides accurate representation of the relative loss rather than absolute loss. For example, the error between 100 and 121 generates the same loss to the model as 1 and 4. This regularizes the value distribution to make the learning task easier. The normalization step maps the raw values from different content providers to similar ranges which distribute the loss more evenly across content providers without being biased by content providers sending large values.

For some of the options, the online system performs a denormalization step to transform the model prediction to a denormalized value measure. For example, for the last transform using the ratio of the difference between square root of the conversion value ($\sqrt{value}$) and square root of the average value ($\sqrt{meanValue}$) with a square root of the standard deviation of the conversion values ($\sqrt{stdevValue}$), denormalization is performed based on following equations. The prediction determined a value represented by the following equation.

$$pred = E\left(\frac{value^{sqrt} - meanValue^{sqrt}}{stdevValue^{sqrt}}\right) \quad \text{(equation 6)}$$

The expected value (referred to as the roasMultiplier) is determined using the following equation that performs denormalization (in these equations, for a given variable x, the term $x^{sqrt}$ refers to $\sqrt{x}$). Accordingly, the prediction (pred) determined by the previous equation is multiplied with a ratio of square root of stdevValue with the square root of meanValue. The value 1 is added to the product and the resulting sum squared to determine the roasMultiplier.

$$roasMultiplier = \frac{E(value)}{maenValue} \approx \left(\frac{E(value^{sqrt})}{maenValue^{sqrt}}\right)^2 = \quad \text{(equation 7)}$$
$$\left(pred * \frac{stdevValue^{sqrt}}{meanValue^{sqrt}} + 1\right)^2$$

The trained model 810 comprises a shared component 815 and two dedicated components. (a.) A conversion likelihood predictor 820 representing the first dedicated component for predicting a first score representing an expected value of an impression given a conversion occurs. (b.) An expected value predictor 830, representing the second dedicated component for predicting a second score representing a likelihood of a conversion given a user interaction with a content item (for example a click).

In an additional embodiment, the trained model 810 includes a selection bias layer 840 as a first layer for adjusting feature vectors so as to remove selection bias. The trained model 810 receives an input feature vector 850 and determines a conversion likelihood 860 and an expected value for the conversion 870. In the embodiments with the selection bias layer 840, the trained model 810 first transforms the feature vectors with the selection bias layer 840 to remove selection bias. The input feature vector 850 (as is or after the selection bias layer 840) is input into the shared component 815 of the trained model for determining both conversion likelihood 860 and expected value of conversion 870. Each component of the neural network may comprise a plurality of neural network layers.

Figure 9:
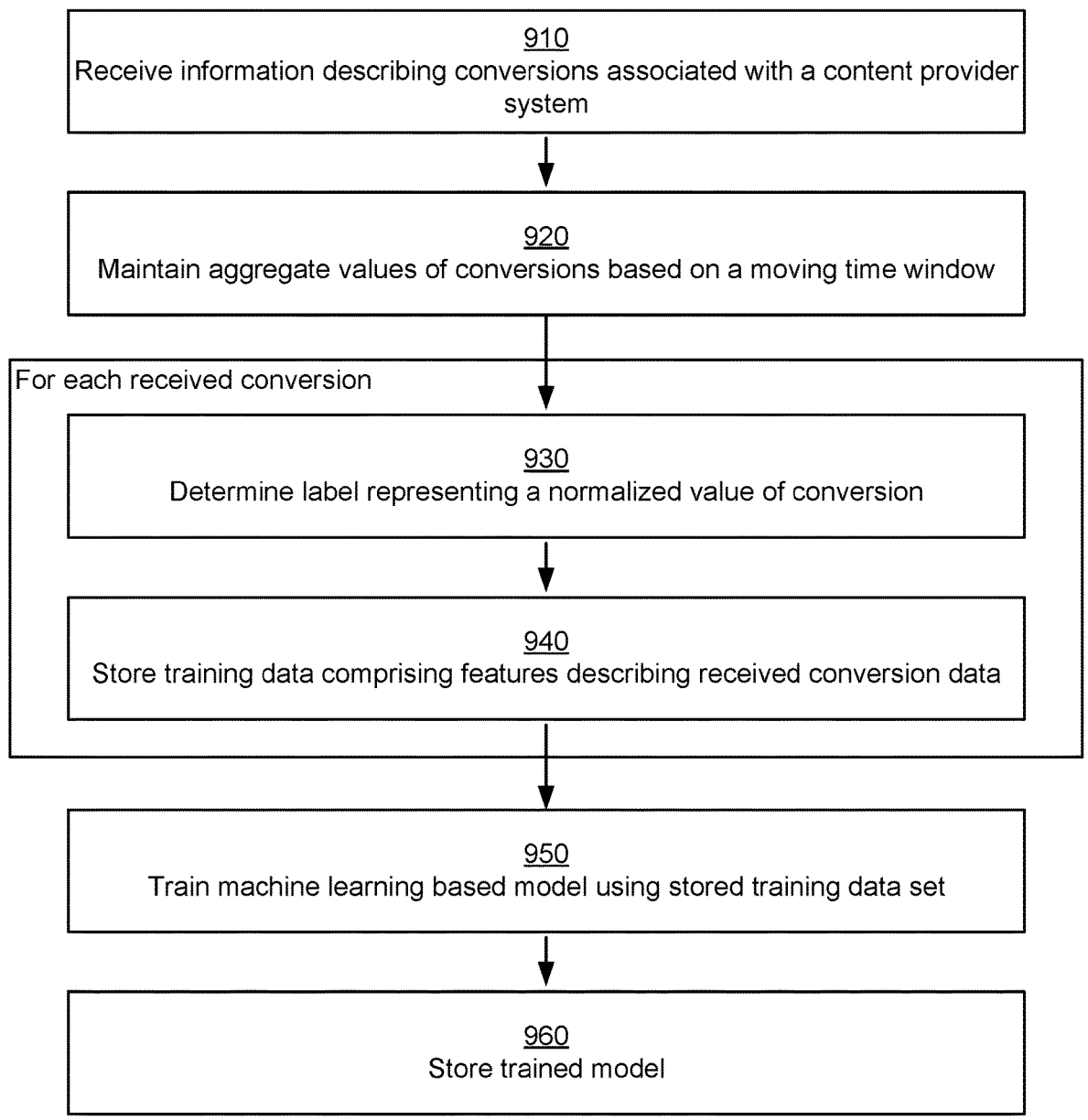
FIG. 9 is a graphical flowchart describing the training process of the machine learning model, in accordance with an embodiment.

FIG. 9 is a graphical flowchart describing the training process of the machine learning model, in accordance with an embodiment. The online system receives 910 information describing conversions associated with a content provider system. The information may be reported by tracking mechanisms such as pixel tracking or applications configured to report user actions to online system. The online system aggregates 920 the received values of conversions based on a moving time window. The aggregate values may be an average value (mean Value), standard deviation (stdevValue) or another aggregate measure.

For each of a plurality of conversion data received by the online system, the machine learning module 700 stores a record representing training data in the training data store 730. The training data further includes a label representing a normalized value of conversion. The machine learning module 700 determines 930 the label according to one of the equations described herein for determining labels based on a conversion value and one or more aggregate measures of conversion values.

The machine learning module 700 further stores 940 training data comprising features describing received conversion data. For example, if the user action represents a purchase, the training data includes (a) item purchased, (b) purchase price (value of conversion), and (c) tracking pixel data describing the conversion as reported to the online system by tracking instructions associated with the content provider system.

The machine learning module 700 trains 950 a machine learning based model using the stored training data set to obtain a trained model 720. The trained model 810 is illustrated in FIG. 8. The machine learning module 700 stores 960 the trained model in the model store 740. The online system accesses the trained models for determining expected values for impressions. The trained model 720 may be used in a process for selecting content items for distributing to users such as the process illustrated in FIG. 5 or variations thereof.

Since the trained model 720 is trained using labels representing normalized conversion values, the online system applies a calibration factor to an expected value of impression determined by executing the trained model 720. The calibration factor is applied after converting the predicted normalized value to a denormalized value representing an estimated value of the impression. In an embodiment, the online system determines the calibration factor by monitoring actual value of a set of conversions and comparing with predicted values. The actual value is determined, for example, by monitoring revenue earned by the content provider system based on a user action such as a purchase.

In an embodiment, the online system interacts with users using different types of user interfaces, each type of user interface providing a different set of features. For example, a first user interface may allow users to view news feed describing other users connected to the user via a social networking system, a second user interface may allow users to interact with each other via one or more messaging channels, and a third user interface may allow sharing of photos. The online system determines a calibration factor for each type of user interface. Accordingly, the online system determines the user interface type being used by a user to create a new session and applies the appropriate calibration factor to determine a calibrated expected value of user actions from a normalized value predicted by an expected value determination module 430.

Determining Expected Value for a Long Attribution Window

The online system uses various mechanisms for tracking user actions performed by users responsive to the user interacting with a content item. These mechanisms are often associated with different user interfaces used by content provider systems for allowing users to perform user actions. For example, a content provider system may allow users to perform user actions via a website and use pixel tracking for reporting user actions. Alternatively a content provider system may allow users to perform user actions via an application (e.g., mobile application) and use the application for reporting user actions. For website based user actions, the majority of value comes from the first day, while user actions based on application result in more values coming from conversions after the first day.

The system determines expected values of conversions (for example purchases) for two consecutive time intervals T1 and T2. For example, T1 may represent a time interval corresponding to the first day and T2 may represent a time interval corresponding to days 2-7 that occur immediately after day 1. Accordingly, the system determines an expected value of an impression as a combination of (1) $E(value_{T1}|conversion_{T1})$ representing the expected value of a conversion within a first time interval T1 (day 1) given that a conversion occurred within the first time interval T1 (day 1) and $P(conversion_{T1})$ representing the likelihood of conversion in time interval T1 (2) $E(value_{T2}|conversion_{T1})$ representing the expected value of conversion within the second time interval T2 (2-7 days) given that a conversion has occurred in T1 (day 1) and $P(conversion_{T1})$ representing the likelihood of conversion in time interval T1 (3) $E(value_{T2}|conversion_{NOT1T2})$ representing the expected value of purchase within T2 given that a conversion did not occur in T1 but occurred in T2 and $P(conversion_{NOT1T2})$ representing the likelihood of conversion not occurring in time interval T1 but occurring in time interval T2.

The online system determines the expected value E(value) for the entire time interval of T1 and T2 by combining the various expected values as follows.

$$E(value) = E(value_{T1}|conversion_{T1}) * P(conversion_{T1}) + E(value_{T2}|conversion_{T1}) * P(conversion_{T1}) + E(value_{T2}|conversion_{NOT1T2}) * P(conversion_{NOT1T2}) \quad \text{(equation 8)}$$

Accordingly, the online system determines the expected value E(value) as the sum of the following terms: (1) E1 representing product of $E(value_{T1}|conversion_{T1})$ and $P(conversion_{T1})$, (2) E2 representing product of $E(value_{T2}|conversion_{T1})$ and $P(conversion_{T1})$, and (3) E3 representing product of $E(value_{T2}|conversion_{NOT1T2})$ and $P(conversion_{NOT1T2})$.

Figure 10:
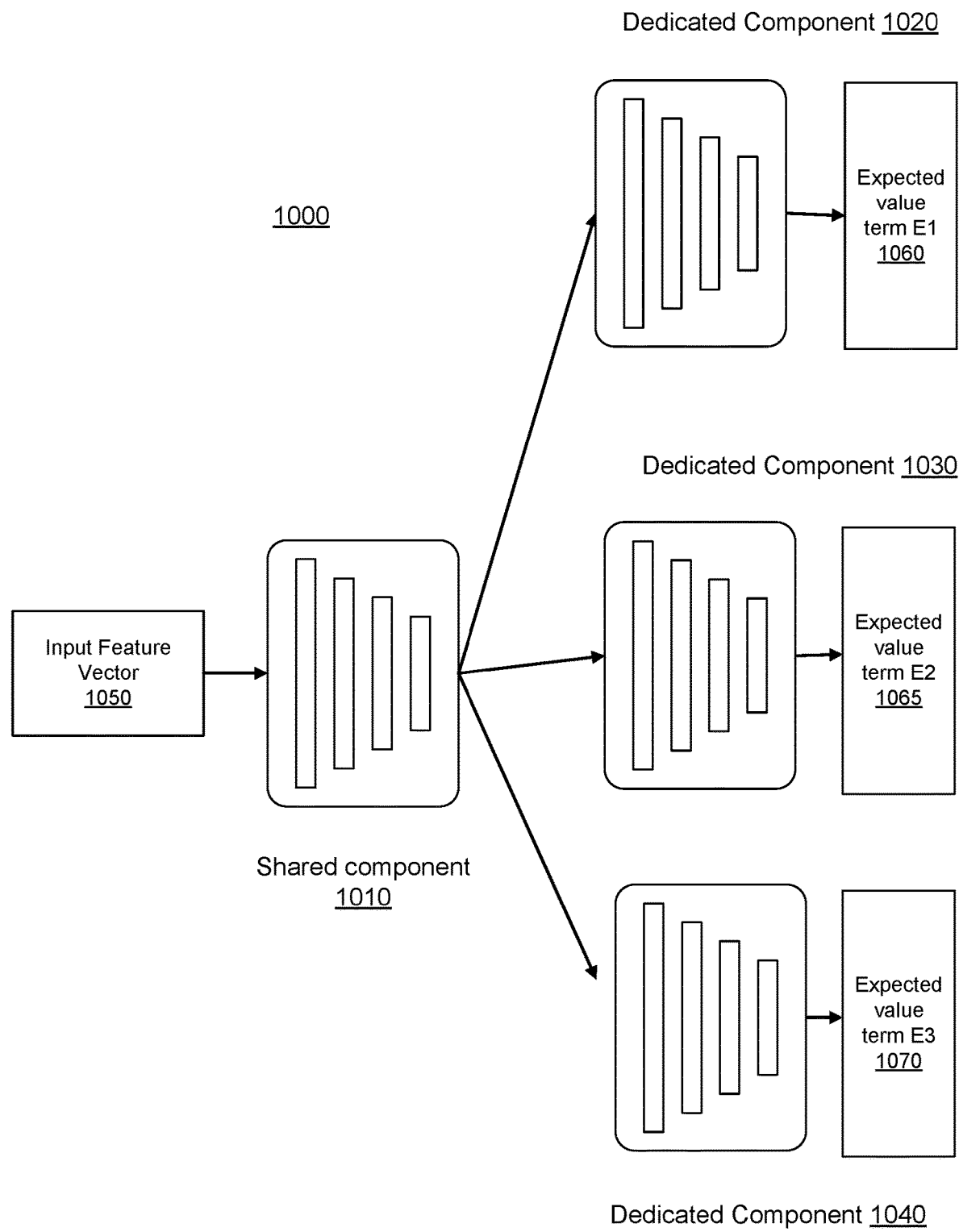
FIG. 10 shows a neural network based model for predicting expected value based on the long attribution window, in accordance with an embodiment.

FIG. 10 shows a neural network based model 1000 for predicting expected value based on the long attribution window, in accordance with an embodiment. The neural network model comprises a shared component 1010 (that receives an input feature vector 1050) and a plurality of dedicated components including a dedicated component 1020 for predicting an expected value term E1 (label 1060), a dedicated component 1030 for predicting an expected value term E2 (label 1065), and a dedicated component 1040 for predicting an expected value term E3 (label 1070). In an embodiment, the training module 710 of the machine learning module 700 trains the neural network 1000 using training data stored in the training data store 730. Accordingly, the trained model 720 corresponds to the neural network 1000. The machine learning module 700 stores the trained neural network 1000 in the model store 740.

Figure 11:
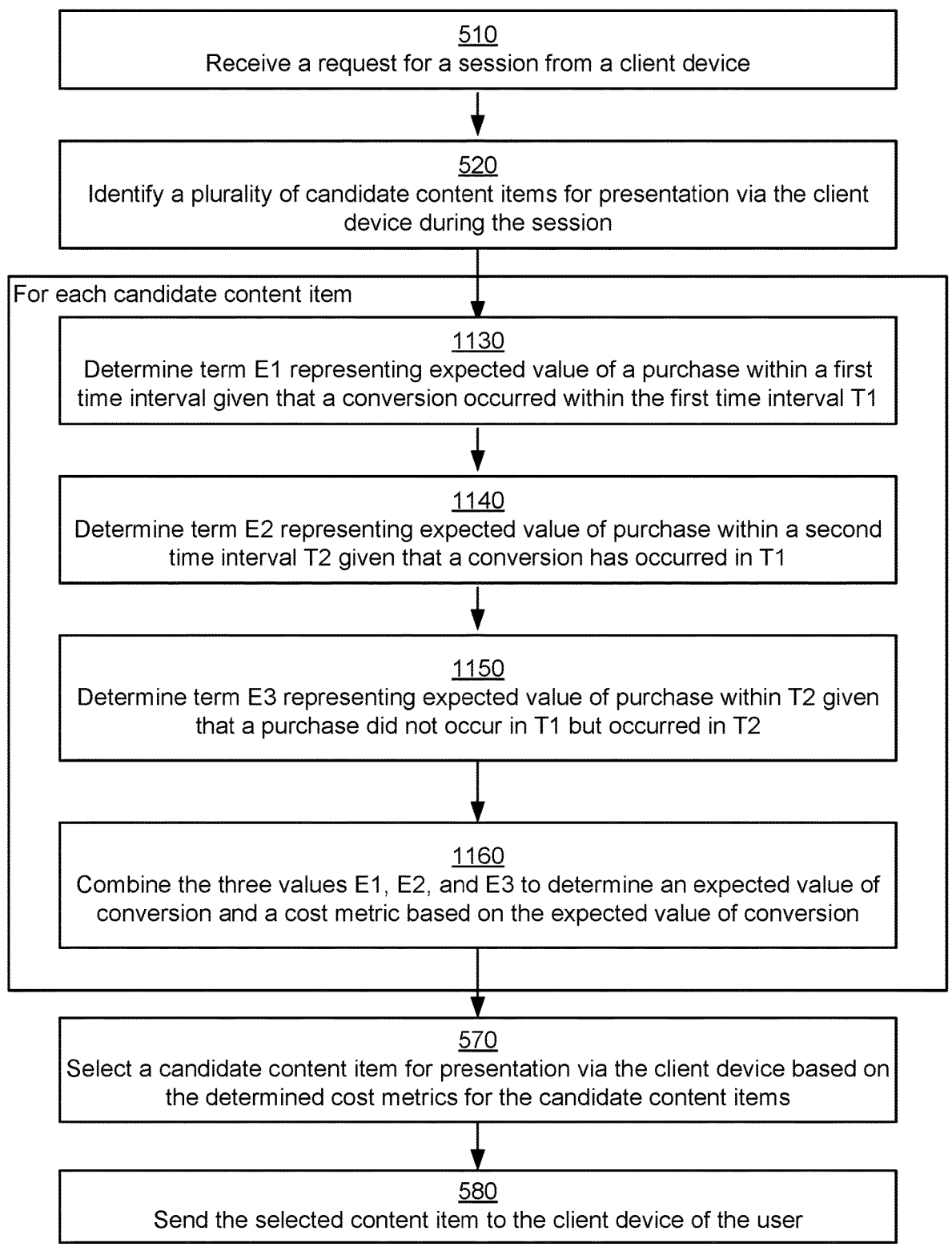
FIG. 11 is a flowchart describing the process of selecting a content item for delivery to a user based on a model based on long attribution window, in accordance with an embodiment.

FIG. 11 is a flowchart describing the process of selecting a content item for delivery to a user based on a model based on long attribution window, in accordance with an embodiment. The steps 510, 520, 570, and 580 correspond to the flow chart shown in FIG. 5.

The online system performs the following steps 1130, 1140, 1150, and 1160 for each candidate content item. The expected value determination module 430 performs following computations: (1) Determines term E1 representing expected value of a purchase within a first time interval given that a conversion occurred within the first time interval T1 (1 day interval). (b) Determines term E2 representing expected value of purchase within a second time interval T2 (2-7 days) given that a conversion has occurred in T1. (c) Determines term E3 representing expected value of purchase within T2 given that a purchase did not occur in T1 but occurred in T2. (d) Combines the three values E1, E2, and E3 to determine E(value) representing expected value of conversion using equation 8 and use the expected value to determine a cost metric based on equation 1. The cost metric is used for selecting a candidate content item for sending to the user.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   receiving, by an online system, a request for a session from a client device of a user;
   identifying a plurality of candidate content items, each candidate content item identified as a potential candidate for sending to the client device during the session, each candidate content item received from a content provider system;
   for each candidate content item, wherein the candidate content item is received from a content provider system:
      providing information describing the content item and session to a machine learning based model, the machine learning based model comprising:
         a shared component,
         a first dedicated component for predicting a first score value representing a likelihood of a user action given a user interaction with the candidate content item, and
         a second dedicated component configured to predict a second score representing an expected value given a user action is performed;
      determining an expected value associated with delivery of the candidate content item by executing the machine learning based model; and
   selecting a candidate content item for presentation via the client device from the plurality of candidate items based on the expected values of the candidate content items; and
   sending the selected content item for presentation via the client device.

2. The computer-implemented method of claim 1, wherein the expected value is a normalized value, the computer-implemented method further comprising:
   determining a denormalized expected value associated with delivery of the candidate content item by applying a calibration factor to the normalized value, wherein the calibration factor is determined based on an aggregate measure of values of impressions of content items.

3. The computer-implemented method of claim 1, wherein the machine learning based model is trained using training data describing past user actions performed by users responsive to being presented with content items, the training data comprising:
   information describing the user action, and
   information describing a tracking request received by the online system describing the user action.

4. The computer-implemented method of claim 3, wherein the tracking request is received responsive to execution of tracking instructions by a client device responsive to displaying a web page associated with the content provider system, the tracking instructions configured to send information describing the web page to the online system.

5. The computer-implemented method of claim 4, wherein the web page comprises a tracking pixel and wherein the tracking instructions are executed by the client device responsive to rendering the tracking pixel on a display of the client device.

6. The computer-implemented method of claim 3, wherein the tracking instructions associated with a tracking identifier are executed by an application executing on a client device responsive to a user performing a particular user action, the tracking instructions configured to send information describing the user action to the online system.

7. The computer-implemented method of claim 3, wherein the training data further comprises, a label representing a normalized value associated with the user action, the normalized value determined using a value associated with the user action, and a mean value of past user actions associated with content items, the mean value determined over one of: a moving time window or a fixed number of most recent user actions.

8. The computer-implemented method of claim 7, wherein the label is determined as a ratio of the value of the user action and the mean value of past user actions.

9. The computer-implemented method of claim 7, wherein the label is determined as a ratio of the square root of the value of the user action and the square root of the mean value of past user actions.

10. The computer-implemented method of claim 7, wherein the label is determined as a ratio of a difference between the value of the user action and the mean value of the user actions and a standard deviation of values of past user actions.

11. A non-transitory computer readable storage medium storing instructions for:
   receiving, by an online system, a request for a session from a client device of a user;
   identifying a plurality of candidate content items, each candidate content item identified as a potential candidate for sending to the client device during the session, each candidate content item received from a content provider system;
   for each candidate content item, wherein the candidate content item is received from a content provider system:
      providing information describing the content item and session to a machine learning based model, the machine learning based model comprising:

a shared component,
a first dedicated component for predicting a first score value representing a likelihood of a user action given a user interaction with the candidate content item, and
a second dedicated component configured to predict a second score representing an expected value given a user action is performed;
determining an expected value associated with delivery of the candidate content item by executing the machine learning based model; and
selecting a candidate content item for presentation via the client device from the plurality of candidate items based on the expected values of the candidate content items; and
sending the selected content item for presentation via the client device.

12. The non-transitory computer readable storage medium of claim 11, wherein the expected value is a normalized value, the stored instructions further for:
determining a denormalized expected value associated with delivery of the candidate content item by applying a calibration factor to the normalized value, wherein the calibration factor is determined based on an aggregate measure of values of impressions of content items.

13. The non-transitory computer readable storage medium of claim 11, wherein the machine learning based model is trained using training data describing past user actions performed by users responsive to being presented with content items, the training data comprising:
information describing the user action, and
information describing a tracking request received by the online system describing the user action.

14. The non-transitory computer readable storage medium of claim 13, wherein the tracking request is received responsive to execution of tracking instructions by a client device responsive to displaying a web page associated with the content provider system, the tracking instructions configured to send information describing the web page to the online system.

15. The non-transitory computer readable storage medium of claim 14, wherein the web page comprises a tracking pixel and wherein the tracking instructions are executed by the client device responsive to rendering the tracking pixel on a display of the client device.

16. The non-transitory computer readable storage medium of claim 13, wherein the tracking instructions associated with a tracking identifier are executed by an application executing on a client device responsive to a user performing a particular user action, the tracking instructions configured to send information describing the user action to the online system.

17. The non-transitory computer readable storage medium of claim 13, wherein the training data further comprises, a label representing a normalized value associated with the user action, the normalized value determined using a value associated with the user action, and a mean value of past user actions associated with content items, the mean value determined over a moving window.

18. The non-transitory computer readable storage medium of claim 17, wherein the label is determined as a ratio of the value of the user action and the mean value of past user actions.

19. The non-transitory computer readable storage medium of claim 17, wherein the label is determined as a ratio of the square root of the value of the user action and the square root of the mean value of past user actions.

20. The non-transitory computer readable storage medium of claim 17, wherein the label is determined as a ratio of a difference between the value of the user action and the mean value of the user actions and a standard deviation of values of past user actions.

* * * * *